United States Patent [19]

Konishi

[11] Patent Number: 4,926,250
[45] Date of Patent: May 15, 1990

[54] COLOR IMAGE RECORDING AND REPRODUCING APPARATUS UTILIZING A MONOCHROMATIC RECORDING MEDIUM

[75] Inventor: Motofumi Konishi, Yokohama, Japan

[73] Assignee: Canon Kabushiki Kaisha, Tokyo, Japan

[21] Appl. No.: 184,015

[22] Filed: Apr. 20, 1988

[30] Foreign Application Priority Data

Apr. 24, 1987 [JP] Japan .............................. 62-101618
Jun. 30, 1987 [JP] Japan .............................. 62-160936

[51] Int. Cl.$^5$ .............................................. H04N 1/46
[52] U.S. Cl. ...................................... 358/75; 358/78; 358/81; 354/104
[58] Field of Search ........................... 358/75, 78, 81; 354/102, 104, 105

[56] References Cited

U.S. PATENT DOCUMENTS 4,255,766 3/1981 Matsuda et al. ..................... 358/257
4,320,419 3/1982 Cottriall .............................. 358/258

Primary Examiner—James J. Groody
Assistant Examiner—Robert M. Bauer
Attorney, Agent, or Firm—Fitzpatrick, Cella, Harper & Scinto

[57] ABSTRACT

A recording apparatus for recording a multi-color document on a monochromatic recording medium, and an image reproducing apparatus for reproducing the multi-color image from the monochromatic recording medium. The recording apparatus includes detection equipment for detecting the color of the image recorded on the document, apparatus for monochromatically recording the document image on the recording medium, and apparatus for recording on the recording medium information corresponding to the color detected by the detection means. The image reproducing apparatus includes detection equipment for detecting the information recorded on the recording medium, and apparatus for applying to the image carrier a color corresponding to the information detected by the detection means.

20 Claims, 12 Drawing Sheets

| NO. | SADDR. | EADDR. | LENGTH | C |
|---|---|---|---|---|
| 1 | 1000 | 1099 | 80 | 1 |
| 2 | 1100 | 1249 | 100 | 0 |
| 3 | 1250 | 1349 | 80 | 1 |
| 4 | | | | |
| | | | | | ary
COLOR IMAGE RECORDING AND REPRODUCING APPARATUS UTILIZING A MONOCHROMATIC RECORDING MEDIUM

BACKGROUND OF THE INVENTION

1. Field of the Invention

The present invention relates to a recording apparatus for recording an image of an original document onto a recording medium, and an image reproducing apparatus for reproducing the image recorded on the recording medium.

2. Related Background Art

In a prior art image recording apparatus for recording an image of a document onto a recording medium such as a microfilm, a multi-color recording medium such as a color film is used to record a color image onto the recording medium, or a color printer such as a color copier or color ink jet printer is used. However, in the recording apparatus which uses the color film, the size and cost of the apparatus is large and processing time thereof is long. The color printer is also expensive. Accordingly, the prior art apparatus is very expensive as a whole.

SUMMARY OF THE INVENTION

It is an object of the present invention to provide an inexpensive recording apparatus which is compact and simplified.

It is another object of the present invention to provide a recording apparatus which can record color information of an image without using a color film or color printer.

It is another object of the present invention to provide an apparatus which can monochromatically record an image of a document and color information of the image. It is another object of the present invention to provide an image reproducing apparatus which can reproduce a color image from a recording medium having an image monochromatically recorded thereon.

It is another object of the present invention to provide an image reproducing apparatus which can reproduce a color image from an image of a monochromatic recording medium.

In the present invention, in order to achieve the above objects, detection means are provided to detect a color of an original image based on a color of an image of the original document, and information corresponding to the color detected by the detection means is recorded on a monochromatic recording medium together with the image of the document.

In accordance with the present invention, detection means are provided to detect information for setting a color of an image on a monochromatic recording medium, and color is applied to an image carrier in accordance with the information detected by the detection means.

BRIEF DESCRIPTION OF THE DRAWINGS

FIG. 3 shows a partial plan view of a film having information recorded thereon in the embodiment of the present invention.

DETAILED DESCRIPTION OF THE PREFERRED EMBODIMENTS

Figure 1:
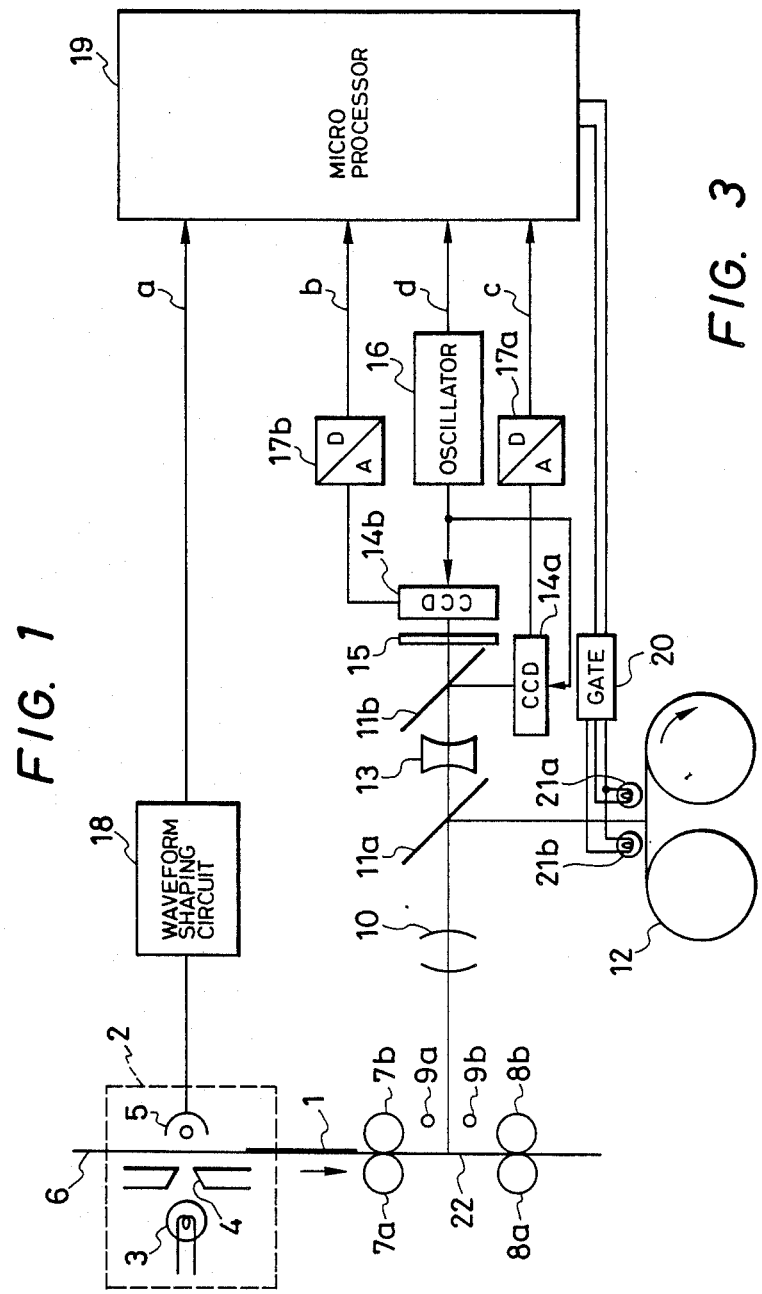
FIG. 1 is a block diagram of a first embodiment of an image recording apparatus of the present invention.

FIG. 1 shows a block diagram of a first embodiment of an image recording apparatus of the present invention. Numeral 1 denotes document as an object to be recorded, numeral 2 denotes a document detector for detecting entrance of the document 1 fed through a path 6, and it comprises a light source 3, a slit 4 and a photo-electric conversion element 5. Numerals 7a, 7b and 8a, 8b denote pairs of rollers which feed the document 1. Numerals 9a and 9b denote illumination light sources arranged between the rollers 7a, 7b and 8a, 8b for illuminating the fed document 1.

Numeral 10 denotes an imaging lens, numerals 11a and 11b denote half-mirrors, numeral 12 denotes a monochromatic microfilm as a recording medium on which a color image is monochromatically recorded, numeral 13 denotes an adjusting lens, numerals 14a and 14b denote CCD's as image sensors, numeral 15 denotes a color filter as color detection means which is arranged between the half-mirror 11b and the CCD 14b, numeral 16 denotes an oscillator for generating a clock signal to sequentially read signals of the CCD's 14a and 14b, numerals 17a and 17b denote A/D converters for digitizing analog signals read by the CCD's 14a and 14b, numeral 18 denotes a waveform shaping; circuit for processing a level of the signal from the photo-electric conversion element 5 of the document detector 2, numeral 19 denotes a controlling microprocessor which processes a level signal a from the waveform shaping circuit 18, a pulse signal d from the oscillator 16, and digital image signals c and b from the A/D converters 17a and 17b, numeral 20 denotes a gate circuit connected to the controlling microprocess or 19, and numerals 21a and 21b denote light sources for forming blip mark images to indicate color information of the document on the microfilm F.

The operation of the present embodiment is as follows. When a power (not shown) is turned on, documents accommodated in document feeder are separated one by one. When the document passes through the document detector 2 on the path 6, a logical "1" signal is produced by the waveform shaping circuit 18 and it is supplied to the controlling microprocessor 19. The document 1 is further fed and when it passes through the light exposure station 22 between the rollers 7a, 7b and 8a, 8b, the image is recorded on the film 12 through the lens 10 and the half-mirror 11a. The document 1 and the film 12 are fed in synchronism. On the other hand, the image signal which passed through the half-mirror 11a is again split by the half-mirror 11b and they are focused onto the CCD's 14a and 14b. It is preferable that the longitudinal direction of the CCD's 14a and 14b is normal to the plane of the sheet. When the color filter 15 is a red filter, the image information on the CCD 14b does not include red image information but the image information on the CCD 14a has no loss of information. Thus, the digital image signal b from the A/D converter 17b is b=(entire image signal)−(red image signal), and the digital image signal c from the A/D converter 17a is c=(entire image signal). After the document 1 has completely passed through the document detector 2, the level signal a from the waveform shaping circuit assumes a logical "0".

Figure 2:
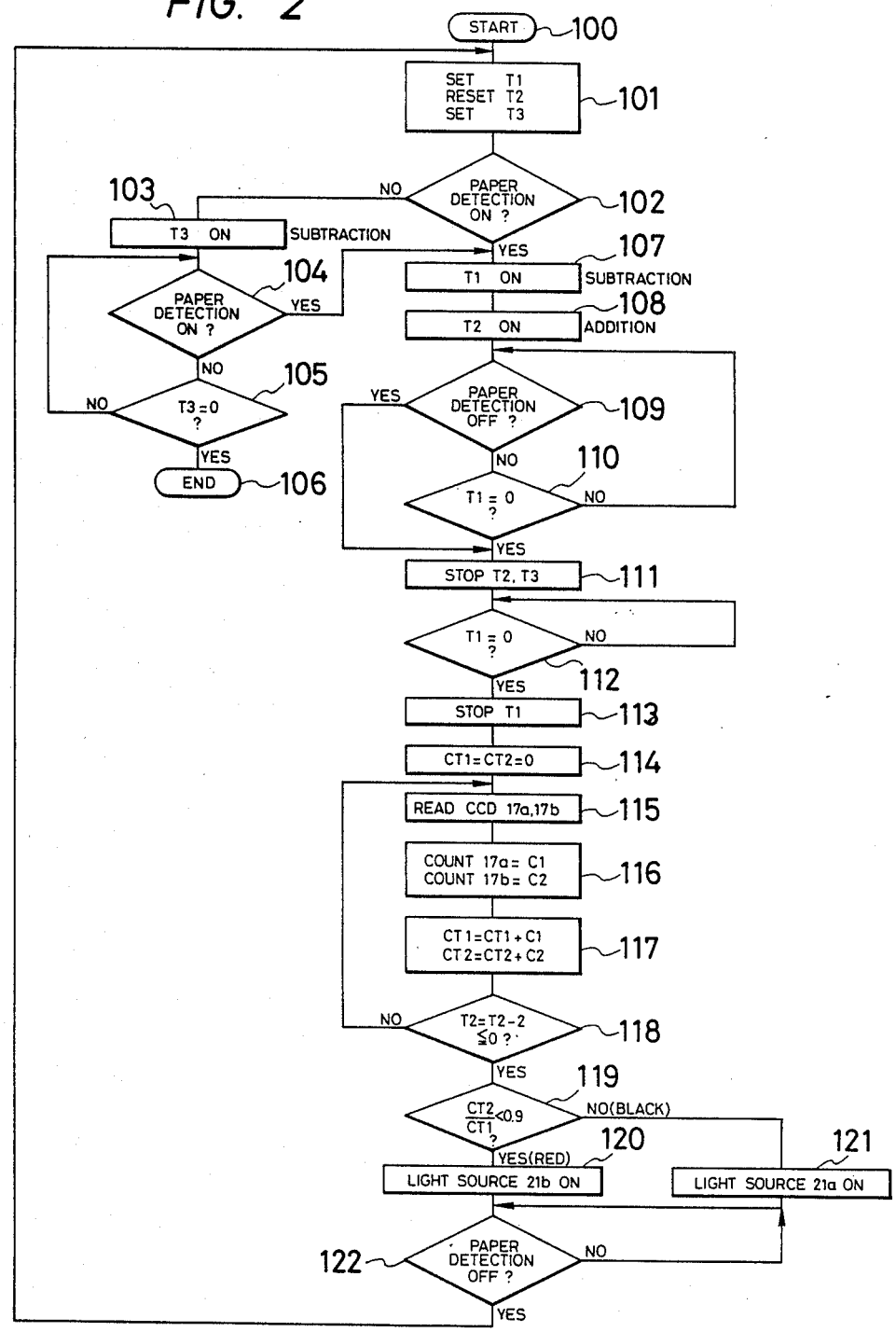
FIG. 2 shows a flow chart of a control system in the embodiment of FIG. 1.

FIG. 2 shows a flow chart of a control program of the controlling microprocessor 19 of the present embodiment. When power is turned on, "START" is executed in a step 100. In a step 101, a timer T2 is reset to "0" and times T1 and T3 are set to particular values. The timer T1 has a value of T1=L/v where v is a velocity of the document 1 and L is a distance between the document detector 2 and the light exposing station 22. On the other hand, the timer T3 is set such that the operation continues if a time interval between the passage of the document 1 through the document detector 2 and the detection of the next document is less than T3 seconds, and the operation is interrupted if the time interval is longer than T3 seconds. It may be set by an operator (steps 102–106). In the present embodiment, a red image document and a black image document are used. A document which has images of two or more colors on one sheet, or three or more documents of different colors may also be used.

When the document 1 is detected in the step 102, the decrement timer T1 and the increment timer T2 are activated (steps 107 and 108), and in steps 109 and 110 either the document detector assumes logical a "0" (sheet detection OFF) or the timer T1 assumes a logical "0". Then, the timer T2 and T3 are deactivated (step 111).

In order to get out of the loop of the steps 109 and 110, (1) Document detection "0". Timer T2 indicates a document or (2) Timer T1 "0". L=v×T2

In the case (1), the process does not get out of the step 112 until the timer T1 assumes a logical "0". When the step 113 is reached, the leading edge of the document 1 has just reached the light exposing station 22. From this moment, the image signal projected to the CCD's 14a and 14b is read at a rate proportional to the clock signal from the oscillator 16 and the number of pixels forming the image is counted (steps 115–117).

In a step 118, discrimination is performed at a double speed after passage of the document 1 through the light exposure station 22. In the case (1), counting is effected until a mid-point of the document 1 is reached. At the time when the process gets out of the step 118, CT1 indicates the total number of pixels and CT2 indicates (the total number of pixels)−(the number of red pixels). In a decision step 119, if the number of red pixels is no less than 10% of the total number of pixels, the document is determined as red (white background with red image), and if the number of red pixels is less than 10%, the document is determined as black (white background with black image). The decision level may be appropriately set. In a step 120, the light source 21b is turned on in response to the determination of the red document to record a blip mark at a top of a frame in which the red document is recorded. In a step 121, the light source 21a is turned on in response to the determination of the black document to record a blip mark at a bottom of a frame in which the black document is recorded. In the present embodiment, the blip mark (color identification mark) is recorded at the top or bottom of the image frame on the microfilm 12. Alternatively, blip marks of different sizes may be recorded at one of the top and bottom of the frame depending on the determination of the color. In a step 122, if the document detector 2 no longer detects the document 1, the process returns to the step 101. Thus, a large loop of the steps 101–122 is formed. The film on which the document image and the mark have been recorded is developed and fixed by a known developing unit.

FIG. 3 shows a film formed in the present embodiment. Slips F1, F2, F3, F4 . . . which are images of the document 1 are sequentially recorded on the film 12, and the slips F1 and F2 are determined as black slips (documents having black images) and the slips F3 and F4 are determined as red slips (documents having red images), based on the position of the blip marks recorded in the steps 119–121. The slips F1 and F4 are wide slips and the slips F2 and F3 are narrow slips. The width of the slip is detected by the comparison with the distance L between the document detector 2 and the light exposing station 22.

Figure 4:
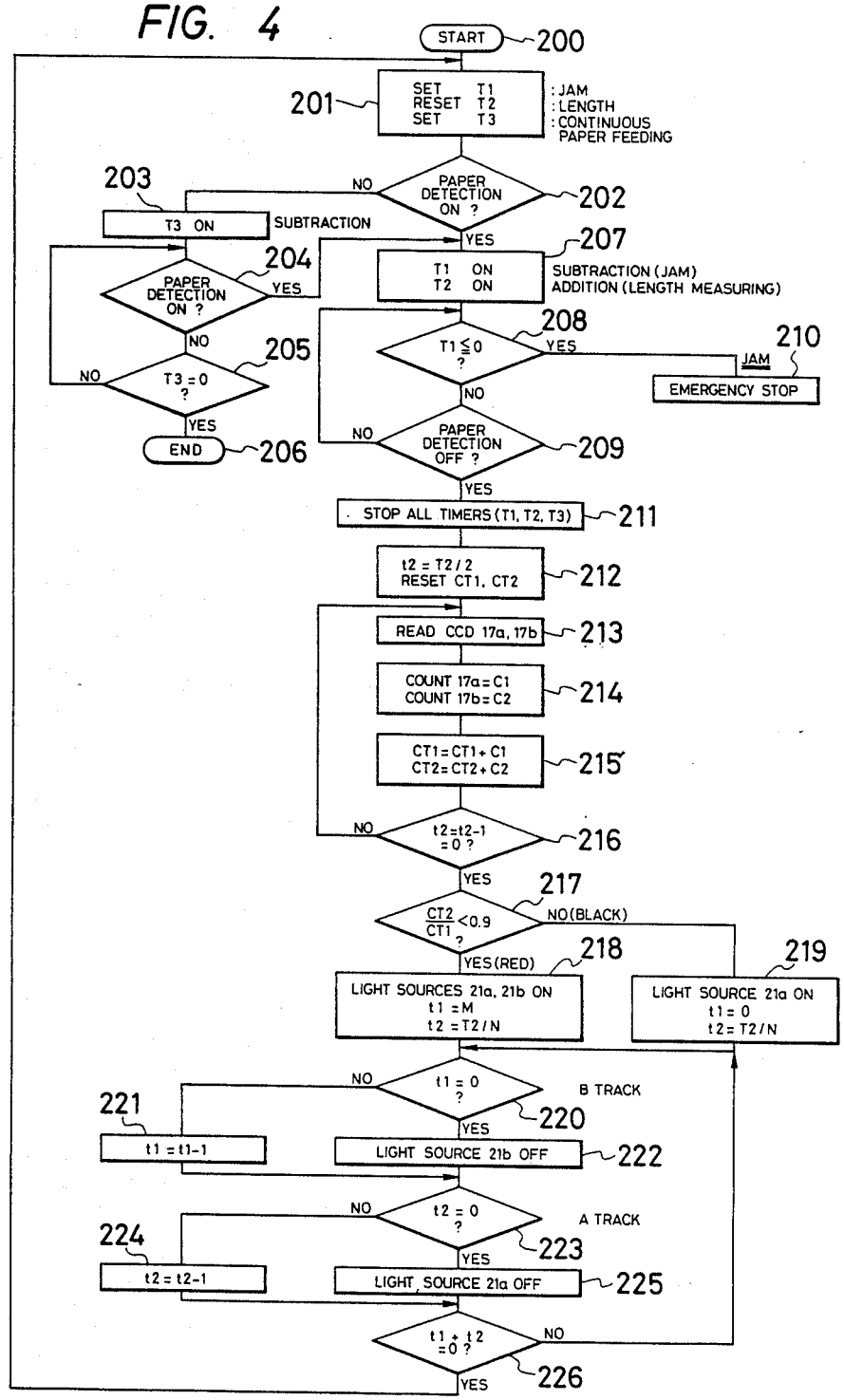
FIG. 4 shows a flow chart of a second embodiment of the image recording apparatus of the present invention.

FIG. 4 shows a flow chart of a record embodiment of the image recording apparatus of the present invention. A hardware configuration of the second embodiment is identical to that of the first embodiment. In FIG. 4, steps 200–207 are essentially same as the steps 100–108 of FIG. 2 except for the value of the timer T1. In the first embodiment, it is a value inherent to the apparatus, that is, it represents the distance from the document detector 2 to the light exposing station 22. In the second embodiment, it is used for detecting a jam. In the second embodiment, the distance from the document detector 2 to the light exposing station 22 is set larger than a possible maximum length of a document. If a document which is longer than that distance is detected, it is determined as double feed (jam) and the apparatus is immediately stopped (steps 208–210). Steps 211–219 are also essentially identical to the steps 111–121 of the first embodiment except for $t_2 = T2/2$, because, in the step 118 of the first embodiment, $T2 = T2 - 2$ while in the step 216 of the second embodiment, $t_2 = t_2 - 1$. It is not an essential difference.

In the first embodiment, only the color is detected, while in the second embodiment, the jam and the length of the document 1 are additionally detected. The timer T2 contains information related to the length of the document 1. In a step 218 or 219, $t_1$ is set to 0 or M, and $t_2$ is set to T2/N (where N and M are values determined by the system) to record the color information and the length information of the document 1 on the film 12 as the presence or absence of the blip mark and the length thereof (steps 220–226). In the present embodiment, when the document 1 is a red slip, blip marks are applied at the top and bottom of the image frame, and when it is a black slip, a blip mark is applied at the bottom.

Figure 5:
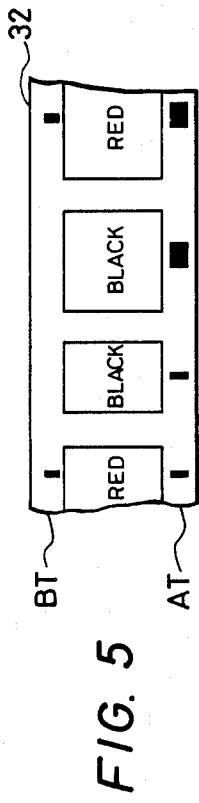
FIG. 5 shows a partial plan view of a film having information recorded thereon in the embodiment of FIG. 4.

FIG. 5 shows a microfilm 32 formed by the second embodiment. Blip marks having lengths proportional to the lengths of the documents 1 are recorded on an A-track AT, and color information representing the colors of the documents are recorded on a B-track BT. In the second embodiment, since the distance from the document detector 2 to the light exposing station 22 is sufficiently long, the blip mark bearing information is located at substantially the center of the image frame on which the document is recorded.

Figure 6:
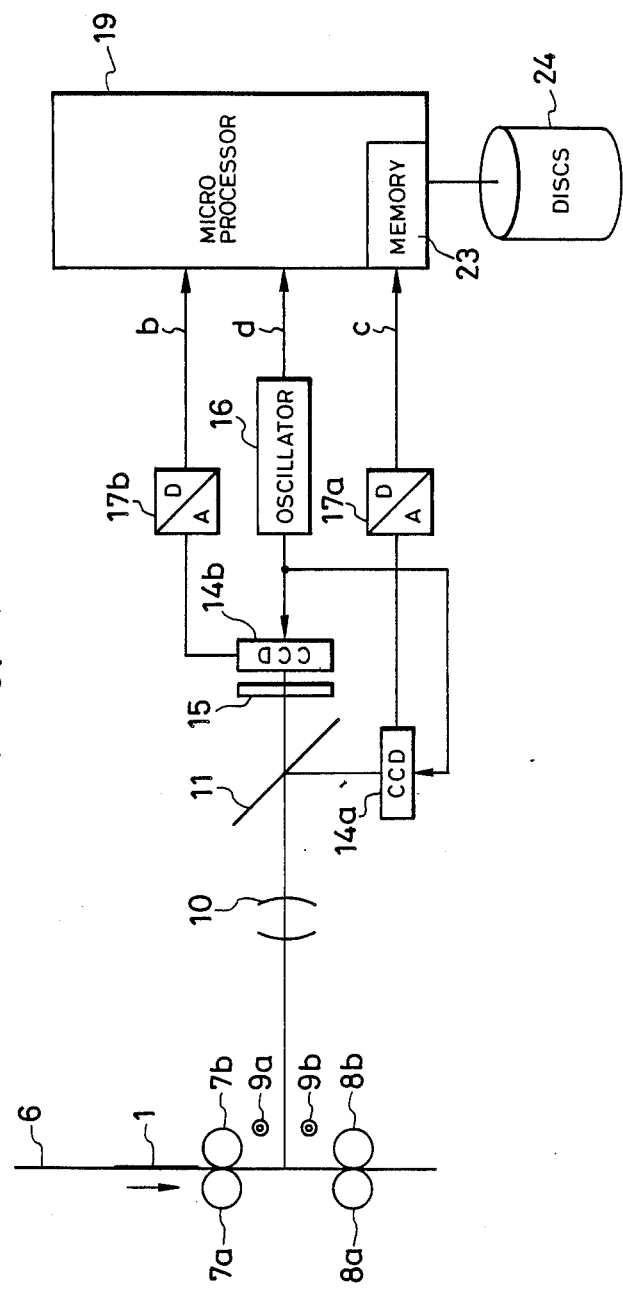
FIG. 6 shows a block diagram of a third embodiment of the image recording apparatus of the present invention.

FIG. 6 shows a third embodiment of the image recording apparatus of the present invention. Elements similar to those shown in the first embodiment are designated by like numerals. In the present embodiment, unlike the first and second embodiments in which the analog image of the document 1 is recorded on the microfilm 12, information from the CCD's 14a and 14b are digitized by the A/D converters 17a and 17b, and the digital image signals c and b are transferred to the controlling microprocessor 19 for processing. The processed signals are recorded on the optical or magnetic disk 24 as the recording medium.

In the third embodiment, the document 1 is detected directly by the CCD 14a. The signal read by the CCD 14a is supplied through the A/D converter 17a to the controlling microprocessor 19 as the digital image signal c and it is stored in the internal memory 23. The information of the CCD 14b is also read through the color filter 15 to discriminate the red and black documents 1 as is done in the first and second embodiments. In the third embodiment, since it is not necessary to apply the blip mark simultaneously with the recording of the image, $t_2$ (step 216) in FIG. 4 is not counted. When the document 1 has passed through the light exposing station 22, a decision similar to that in the step 217 of the second embodiment (FIG. 4) is made and the result thereof is recorded on the disk 24.

Figures 7, 8:
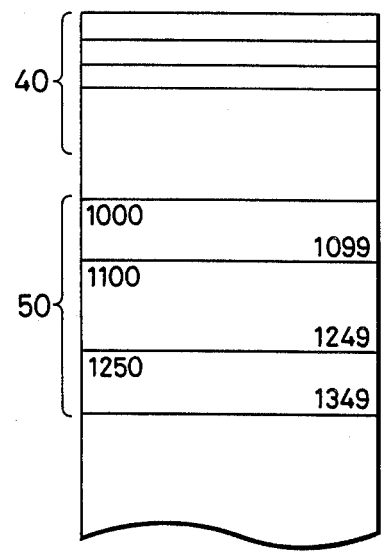
FIG. 7 shows a logical format in which an image is recorded on a disk in the embodiment of FIG. 6.
FIG. 8 shows a format of an indexing unit of FIG. 7.

FIG. 7 shows a logical format in which the image is recorded on the disk 24. The disk 24 is logically divided into two parts, an index field 40 and an image data field 50, and the image of the image data document is recorded thereon as digital information. The image data is usually data-compacted before it is recorded.

FIG. 8 shows a detail of the index field 40 of FIG. 7. A first document (No. 1) is recorded in addresses 1000–1099, the length of the document 1 is 80 mm, and C=1 (black slip). A second document (No. 2) is recorded in addresses 1100–1249, the length is 100 mm, and C=0 (red slip). In the third embodiment, the color information (C=0 or 1) is applied to the index field 40 and it has no direct positional relationship with image reading/recording. Accordingly, the color need not be determined in the course of the image reading as is done in the first and second embodiments but it may be done after all information has been read. As a result, precise information is obtained.

In the first, second and third embodiments, the document information as well as the information on the color of the document are extracted by optical means such as a color filter or half-mirror and they are recorded corresponding to related areas of the record area of the document image. Such information may be taken out of the apparatus for use as index information of CAR (computer aided retrieval). In this case, it is not essential to exercise control by the blip mark as is done in the first and second embodiments.

When sales slips are used as the documents, the slips are usually black on a white background, but when the transaction is cancelled, a black image on a red background may be used or a red image on a white background may be used. In this case, when the image recording apparatus of the present embodiment is used, the type of slip may be specified by recording the color information on the recording medium. By controlling a print color of a two-color printer by the color information, it is possible to print a black image on a normal slip and a red image on a red slip. When a document having more than two colors is used, additional color filters and CCD's are provided in accordance with the number of colors of the document image and the numbers of pixels of the respective colors are compared to set the colors of the document image.

In the present embodiment, the document which is the object to be recorded is a slip. Alternatively, it may be a check, note, stock certificate, drawing or printed material.

In the present embodiment, the document is fed to the light exposing station. Alternatively, the document may be stationary and the optical system or imaging element may be moved to scan the document. When one document contains an image of two or more colors, the numbers of pixels of the respective colors are compared and the color of the document image is determined in accordance with the comparison result. For example, the color corresponding to the largest or next to the largest number of pixels is determined as the color of the document image.

In accordance with the image recording apparatus of the present invention, the construction of the apparatus is facilitated and the information on the color of the document can be simply recorded simultaneously with the recording of the document image.

In the present embodiment, the microfilm is used as the image recording medium, although any other recording media which can monochromatically record the color image may be used. The color information to be recorded on the recording medium may be marks of different sizes, densities, shapes or positions.

Embodiments of the image reproducing apparatus which reproduces a monochromatic image on an image recording medium onto a record sheet are now explained.

Figure 9:
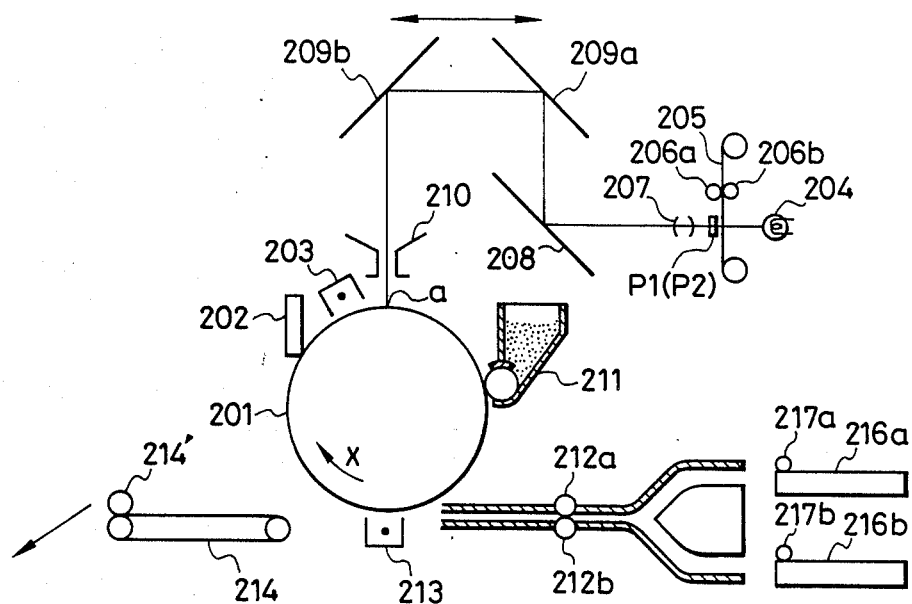
FIG. 9 shows a configuration of a first embodiment of an image reproducing apparatus of the present invention.

FIG. 9 shows a configuration of a first embodiment of the image reproducing apparatus of the present invention. Numeral 201 denotes a photo-conductor drum as an image carrier, which rotates in a direction of an arrow X. Numeral 202 denotes a cleaning blade for cleaning a toner image after printing, numeral 203 denotes a corona charger for uniformly charging the photo-conductor drum 201, and numeral 204 denotes a light source by which the image on the microfilm 205 as the information recording medium formed in the previous embodiment is projected onto the photo-conductor drum 201 through a lens 207. Numeral 208 denotes a mirror for bending a light path, and numerals 209a and 209b denote a pair of scanning mirrors arranged to make an angle of 90° to each other for scanning an enlarged image of the microfilm at a light exposure point a on the photo-conductor drum 201. Numeral 210 denotes a slit which prevents unnecessary image from being projected onto the photo-conductor drum 201. Numeral 211 denotes a developing unit for developing a latent image on the photo-conductor drum 201, numerals 212a and 212b denote a pair of register rollers for guiding a print sheet as the record sheet to the photoconductor drum 201, numeral 213 denotes a transfer charger, numeral 214 denotes a fixing and feeding belt, numerals 216a and 216b denotes sheet cassettes, and numerals 217a and 217b denote pick-up rollers for feeding out the sheets from the sheet cassettes 216a and 216b, respectively.

After the photo-conductor drum 201 has been uniformly charged by the corona charger 3, the image on the microfilm 205 illuminated by the light source 204 is reflected back by the mirror 208 through the lens 207. By moving the scanning mirrors 209a and 209b in the direction of the arrow, the image is sequentially exposed onto the photo-conductor drum 201 so that an electrostatic latent image is formed. The electrostatic latent image is developed by the developing unit 211. On the other hand, the print sheet is fed to the photo-conductor drum 201 by the register rollers 212a and 212b which are rotated in synchronism with the image on the photo-conductor drum 201. The toner image on the photoconductor drum is transferred to the print sheet by the transfer charger 213. Then, the print sheet is separated from the photo-conductor drum 201 by separation means (not shown) and fed by the feed belt 214 and the toner image is fixed by the heating and fixing roller 214'. The toner left on the photo-conductor drum 201 after the transfer is swept off by the cleaning blade 202 in preparation for the next cycle.

Figure 10:
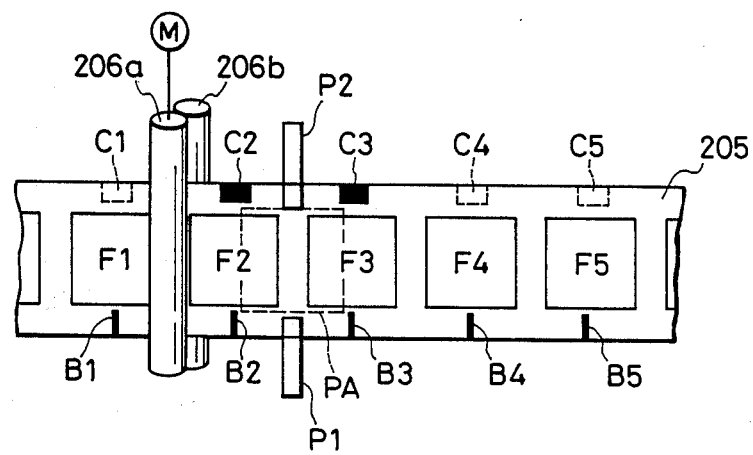
FIG. 10 shows a partial plan view of a microfilm used in the embodiment of FIG. 9.

FIG. 10 shows a film reader of the first embodiment. Numeral 205 denotes the microfilm on which the images are monochromatically recorded in frames F1, F2, .... B1, B2, ... denote first blip marks for indicating the positions of the frames F1, F2, ..., and C1, C2, ... denote second blip marks for indicating the color information of the images recorded in the frames F1, F2, ... .. Those blip marks B1, B2, ... and C1, C2, ... are detected by detectors P1 and P2 as mark detectors. M denotes a motor which drives one of capstan rollers 206a and 206b to feed the microfilm 205.

The operation of the first embodiment is explained with reference to a flow chart shown in FIG. 11. In a step 300, a process is started. The microfilm 205 is loaded in the film carrier (not shown) in a known manner. The microfilm 205 is moved to locate a desired image frame (step 301). This is attained by driving the motor M to rotate the capstan roller 206a and 206b. In a step 302, whether the mark detector P1 is in an activated state or not is checked, and the film 205 is fed until the desired image frame appears, when the film is stopped (steps 303 and 304). During the feed of the film 205, the mark signal is detected by the mark detector P1, and if the image frame is not the desired one, the feed of the film 205 is continued. If it is the desired image frame, the feed of the film 205 is stopped.

The film 205 is stopped, the image on the image frame is projected onto the screen (not shown), and an operator watches the image and depresses a print key (not shown) if he/she wishes a printout (step 305), or if he/she does not need a printout, the end of the job is examined in a step 316. Then, the process terminates (step 317) or repeats from the step 301.

If the printout is desired in the step 305, the photo-conductor drum 201 is rotated in the direction of the arrow X, the remaining toner is removed by the cleaning blade 202, and the photo-conductor drum 201 is uniformly charged by the corona charger (step 306). The second blip mark is read by the mark detector P2 and one of the pick-up rollers 217a and 217b related to the sheet cassettes 216a and 216b, respectively, is driven. In the present embodiment, white sheets are contained in the sheet cassette 216a and red sheets are contained in the sheet cassette 216b. When the mark detector P2 for detecting the color information is then activated (to detect the mark), a step 308' is executed and the red sheet cassette 216b is selected. Thus, the red sheet is fed to the photo-conductor drum 201 (steps 307-311). On the other hand, when the mark detector P2 is deactivated, a step 308 is executed and the sheet cassette 216a is selected. In a step 312, timing is measured, and the scan of the image of the microfilm 205 is started. Specifically, it is attained by moving two scanning mirrors 209a and 209b in union. At the end of the scan, the movement of the scanning mirrors 209a and 209b and the rotation of the photo-conductor drum 201 are stopped (steps 313-315).

Figure 11:
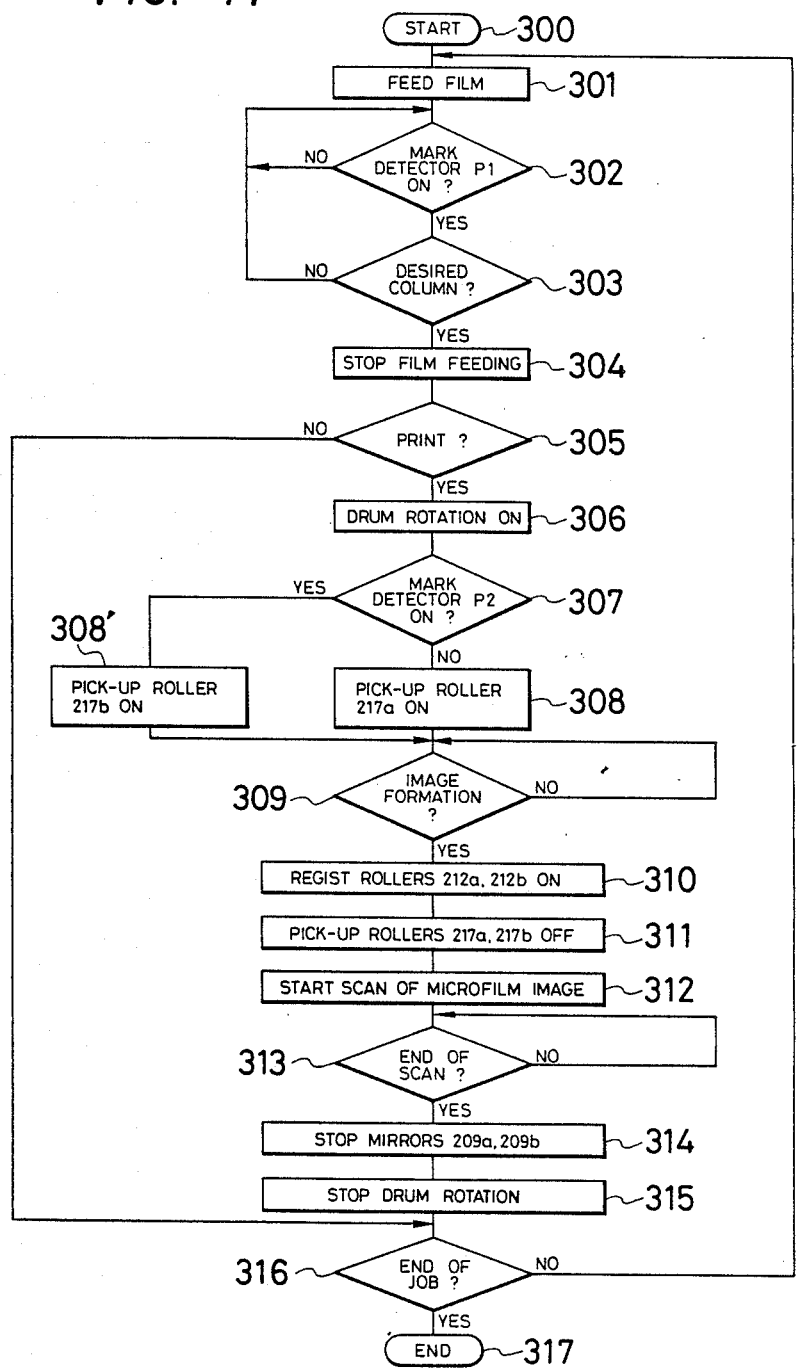
FIG. 11 shows a flow chart of the embodiment of FIG. 9.

While not shown in FIG. 11, if a plurality of printouts are required, the process returns to the step 307 from the step 314 and this loop is repeated as many times as required. If only one printout is required or when the necessary number of printouts have been prepared, job continuation/end is determined in a step 316 and the process either returns to the step 301 or goes to END in a step 317.

In the present embodiment, it is necessary that the sheets contained in the sheet cassettes 216a and 216b are equal in size and have different colors from each other. The combination of the sheets is detected and if it does not meet the condition, an alarm is indicated when the print key is depressed. The steps 306-315 relate to the sequence of the process. It is important that something is done but the sequence of execution is not an important condition in the present invention.

Figure 12:
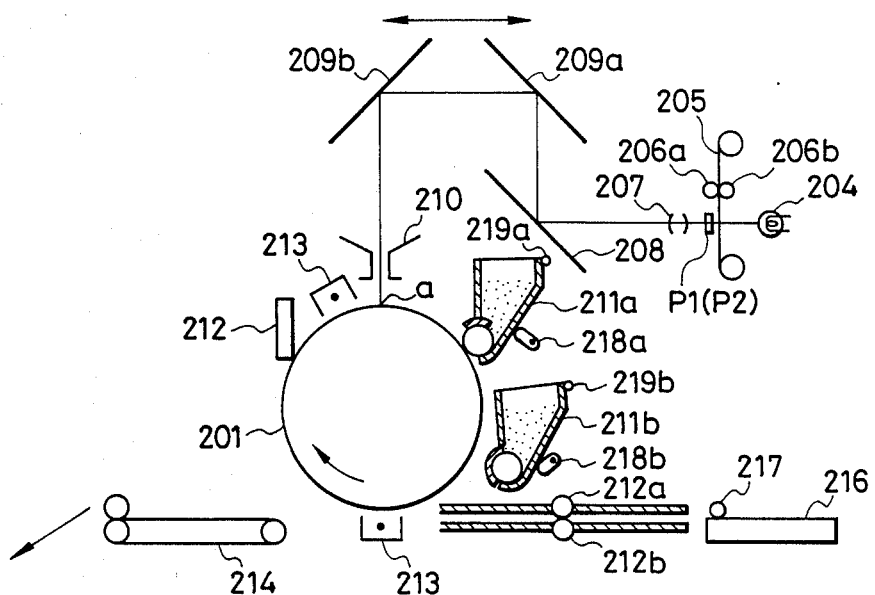
FIG. 12 shows a configuration of a second embodiment of the image reproducing apparatus of the present invention.
Figure 13:
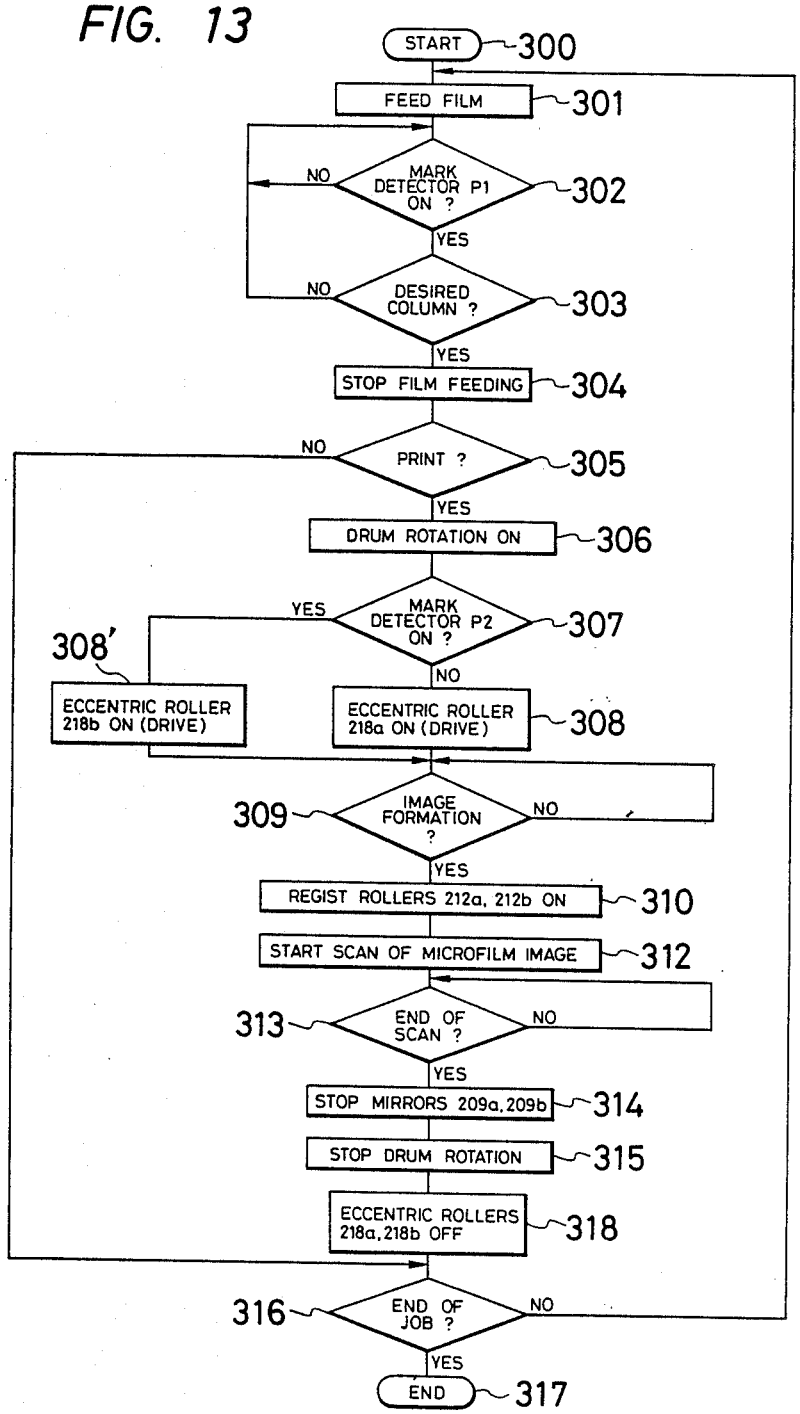
FIG. 13 shows a flow chart of the embodiment of FIG. 12.

FIGS. 12 and 13 show a second embodiment of the image reproducing apparatus of the present invention. Elements similar to those of the first embodiment are designated by like numerals. In the first embodiment, the cassette 216a or 216b is selected by selecting the pickup roller 217a or 217b. In the second embodiment, a first developing unit 211a which develops with black toner and a second developing unit 211b which develops with red toner are provided. The selection of the developing units 211a and 211b is effected by rotating the developing unit 211a or 211b around a shaft 219a or 219b of the developing unit 211a or 211b under the control of an eccentric roller 218a or 218b arranged near the developing unit 211a or 211b, to move the developing unit 211a or 211b to the developing position. The present embodiment thus has a similar function to the switching of the print sheet in the first embodiment. In the second embodiment, images can be printed on both sides of the sheet (double-side print). In the first embodiment, the double-side print makes no sense because the print sheets are switched. In the second embodiment, since toners of different colors are selectively used, it is possible to print with black toner one a first side and print with red toner on a second side. Thus, a black slip and a red slip can be printed out in one sheet.

In the flow chart of FIG. 13, the steps which are different from the flow chart of FIG. 11 are shown by thick lines. Except for the steps to turn on or off the eccentric rollers 218a or 218b for moving the developing unit 211a or 211b into the developing position, the steps are similar to those of FIG. 11. This difference is due to a difference in the hardware configuration and it is not an essential difference. The pickup rollers 217a and 217b and the developing units 211a and 211b in the first embodiment correspond to the movable eccentric rollers 218a and 218b. In FIGS. 12 and 13, other configurations and functions are identical to those of the first embodiment and the explanation thereof is omitted.

Figure 14:
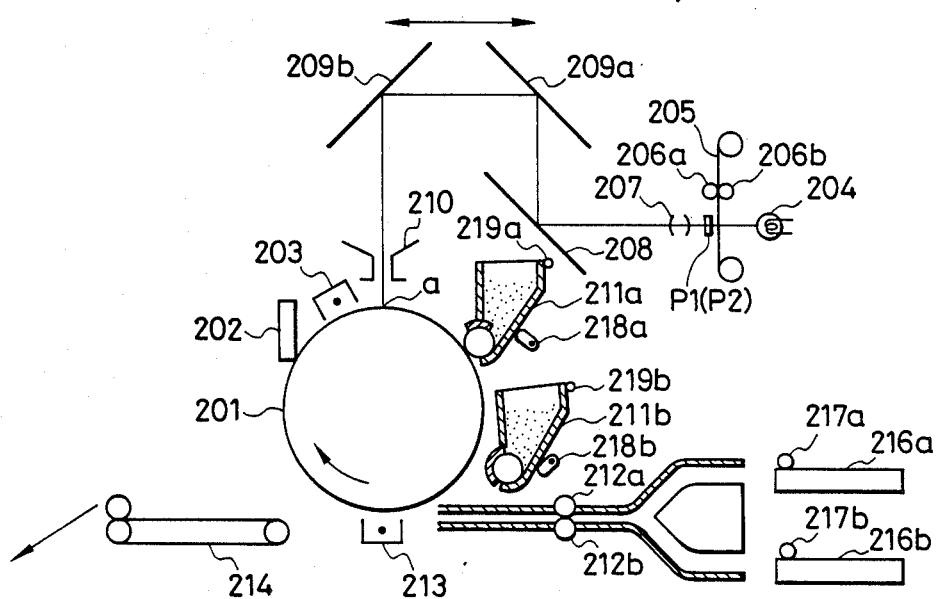
FIG. 14 shows a configuration of a third embodiment of the present invention.
Figure 15:
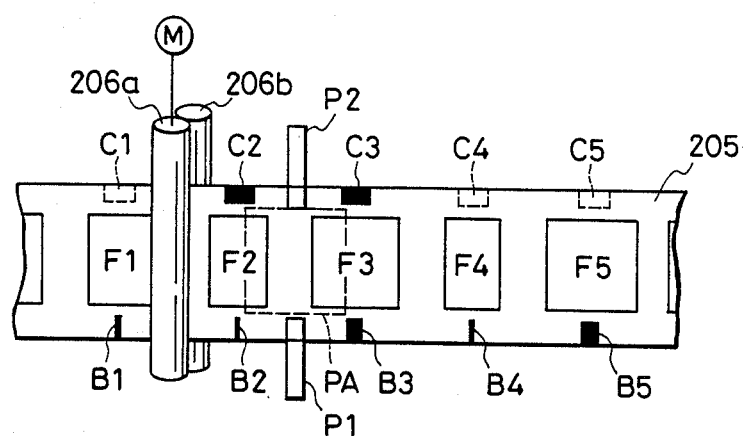
FIG. 15 shows a partial plan view of a microfilm used in the embodiment of FIG. 14.
Figure 16:
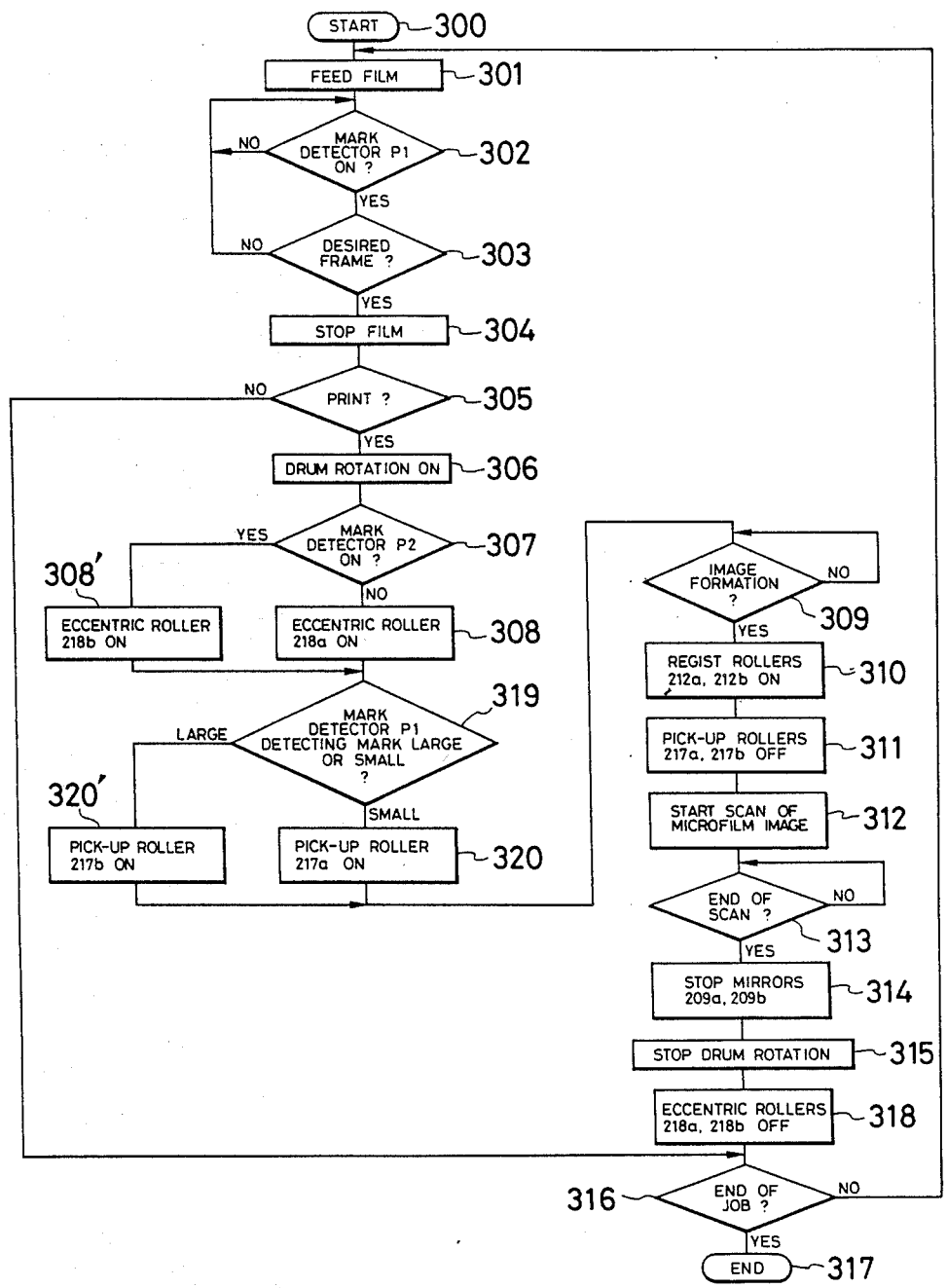
FIG. 16 shows a flow chart of the embodiment of FIG. 14.

FIGS. 14 to 16 show a third embodiment of the image reproducing apparatus of the present invention. Elements similar to those of the first and second embodiments are designated by like numerals. The present embodiment is a combination of the first and second embodiments with a different film format as shown in FIG. 15. In FIG. 15, the blip marks C1, C2, ... which indicate color information are identical to those of the first and second embodiments, but the blip marks B1, B2, B3, ... which indicate the image positions have two sizes (in FIG. 15, the blip marks B3 and B5 are large marks and the blip marks B1, B2 and B4 are small marks). They indicate the size of the object (document) and are used to select the cassette 216a or 216b for changing the print size. The upper cassette 216a contains size A5 white sheets, and the lower cassette 216b contains size A4 white sheets. Thus, the relationship between the image information on the microfilm 205 and the printout is shown below.

TABLE 1

|    | Color | Sheet | Cassette |
|----|-------|-------|----------|
| F1 | Black | A5    | Upper    |
| F2 | Red   | A5    | Upper    |
| F3 | Red   | A4    | Lower    |
| F4 | Black | A5    | Upper    |
| F5 | Black | A4    | Lower    |

In accordance with Table 1, colors corresponding to the color information can be applied to the print sheet of the same size as the original object (document). This is attained by the steps 307-320 of the flow chart shown in FIG. 16.

The third embodiment may include the first and second embodiments. In the microfilm 205 of FIG. 15, the blip marks C1, C2, ... indicating the color information are deleted and blip marks of different sizes indicating the image positions are used as color information. Thus, although the printout is monochromatic, the blip marks B1, B2, B3 ... are used as color information, that is, they indicate the upper and lower cassettes 216a and 216b. Accordingly, by loading sheets of the same size and different colors in the upper and lower cassettes 216a and 216b, the same function as that of the first embodiment is attained. On the other hand, by adding the blip marks C1, C2, ... indicating the color information and loading sheets of the same size and different colors in the upper and lower cassettes 216a and 216b, the function of the first embodiment is attained.

In the third embodiment, rolled sheets may be used instead of the sheet cassettes 216a and 216b. In this case, the lengths of the blip marks B1, B2 and B3 are proportional to the length's of the objects (documents) and the print sheet is cut in proportion to the length of the blip mark so that the printout length is proportional to the document length.

In the first, second and third embodiments, the normal operations thereof are similar to each other but error operations are different. In the first embodiment, if the sheet cassettes 216a and 216b do not contain sheets of the same size, it is detected and the alarm is indicated. In the second embodiment, if the two developing units 211a and 211b are not provided, it is detected and the alarm is indicated. Those alarms are not indicated in the third embodiment.

Figure 17:
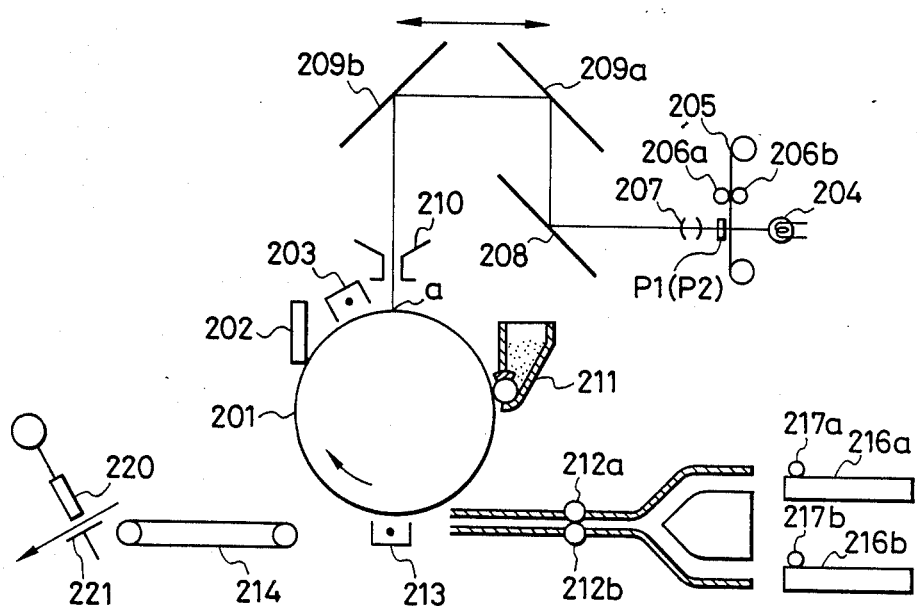
FIG. 17 shows a configuration of a fourth embodiment of the present invention.
Figure 18:
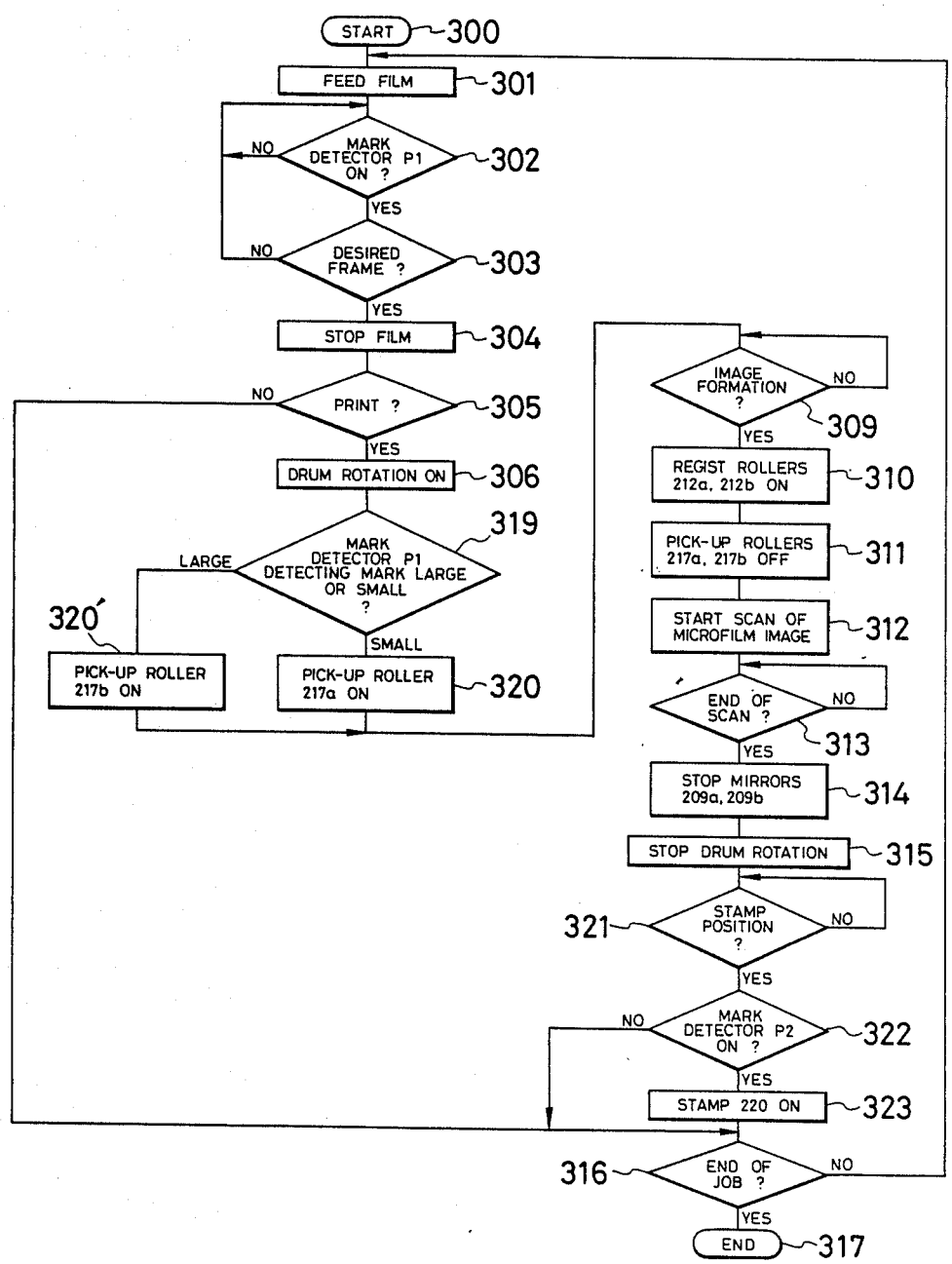
FIG. 18 shows a flow chart of the embodiment of FIG. 17.

FIGS. 17 and 18 show a fourth embodiment of the image reproducing apparatus of the present invention. Elements similar to those of the first to third embodiments are designated by like numerals. The present embodiment is very similar to the third embodiment and the film 205 used is identical. In the present embodiment, when a printout sheet passes through a stamp printer comprising a stamp 220 and a table 221, the blip marks C1, C2, indicating the color information recorded on the film 205 are detected, and whether a stamp such as RED is to be stamped by the stamp 220 is determined (steps 321-323 in the flow chart of FIG. 18). The sheet size is determined in the same manner as the first embodiment. In accordance with the present embodiment, only one developing unit is needed. Other configurations and functions are identical to those of the first to third embodiments and an explanation thereof is omitted.

In the above embodiments, the information signal to be inputted need not necessarily be on one image recording medium (microfilm 205) but it may be on a memory (such as a floppy disk) managed by a host computer like a CAR (computer assisted retrieval).

In the first to third embodiments of the present embodiments, the blip marks C1, C2, . . . indicating the color information are applied at positions related to the positions of the images recorded on the microfilm 205 and they are detected by the mark detector P2 so that the color information of the object is determined and image information of specific colors is printed on a sheet.

In accordance with the image reproducing apparatus of the present invention, the image which the object (document) originally had can be reproduced from the monochromatic record of the image. As a result, an expensive color film is not required and cost is reduced. In addition, the image recording medium of the present invention may be used as an original record.

Means for forming the image on the record sheet are not limited to the electronic photographic recording system but an ink jet printer or a laser beam printer may be used.

What is claimed:

1. An image recording apparatus for monochromatically recording a color image, comprising:
   image recording means for recording an original image onto a recording medium;
   determination means for determining the color of the original image, said determination means including (a) detection means for detecting a characteristic of the color of the original image, and (b) setting means for setting the color of the original image in accordance with a detection signal of the detection means; and information recording means for recording information corresponding to the color determined by said determination means onto said recording medium.

2. An image recording apparatus according to claim 1 wherein the information recorded by said information recording means is of the same color as the image recorded on the recording medium.

3. An image recording apparatus according to to claim 2 wherein said information is a mark representing the color of the original image.

4. An image recording apparatus according to claim 1 wherein said recording medium is a monochromatic film.

5. An image recording apparatus according to claim 4 wherein said information recording means records said information on an edge of the image recorded on the film.

6. An image recording apparatus according to claim 1 wherein said image recording means includes conversion means for converting the original image to a digital signal, and wherein the image is recorded on the recording medium in accordance with the signal from the conversion means.

7. An image recording apparatus according to claim 1 further comprising means for recording information representing the size of the original image.

8. An image recording apparatus for monochromatically recording a color image, comprising:
  image recording means for recording an original image onto a recording medium;
  determination means for determining the color of the original image, said determination means including read means for reading the original image pixel by pixel, and setting means for setting the color of the original image in accordance with the output of said read means; and
  information recording means for recording information corresponding to the color determined by said determination means onto said recording medium.

9. An image recording apparatus for monochromatically recording a color image, comprising:
  image recording means for recording an original image onto a recording medium;
  determination means for determining the color of the original image, said determination means including detection means for detecting the numbers of pixels of respective colors of the original image, and setting means for setting the colors of the original image in accordance with the detected number of pixels; and
  information recording means for recording information corresponding to the color determined by said determination means onto said recording medium.

10. An image recording apparatus according to claim 9 wherein said detection means includes an image sensor for detecting a light from the original image.

11. An image reproducing apparatus for monochromatically recording a color image, comprising:
  detection means for detecting image information and color information recorded on a recording medium
  image forming means for forming on an image carrier an image having a different color from the image information recorded on the recording medium; and
  color application means for applying to said image carrier a color corresponding to the color information detected by said detection means.

12. An image reproducing apparatus according to claim 11 wherein said color application means includes means for selecting the color of the image to be formed by said image forming means in accordance with an output signal of said detection means.

13. An image reproducing apparatus according to claim 11 wherein said image forming means includes means for forming on said image carrier a latent image representing the image recorded on the recording medium, and development means for developing the latent image on the image carrier with different colors.

14. An image reproducing apparatus according to claim 11 wherein said color application means includes means for applying to said image carrier a coloring agent selected in accordance with an output signal of said detection means.

15. An image reproducing apparatus for monochromatically recording a color image, comprising:
  detection means for detecting color information recorded on a recording medium having information on an image and a color thereof;
  image forming means for forming onto an image carrier the image information recorded on the recording medium, said image forming means including hold means for holding image carriers of different colors, and means for feeding the image carriers held in said hold means to an image forming position; and
  selection means for selecting an image carrier having the color corresponding to the color information detected by said detection means.

16. A color image recording apparatus comprising:
  detecting means for detecting an amount of information of each color of an original;
  setting means for setting the color of the original, based on the amount of information of each color detected by said detecting means; and
  recording means for recording on a recording medium information containing the image of the original and the color set by the setting means.

17. An apparatus according to claim 16, wherein the detecting means includes counting means for counting a number of pixels of each color with respect to images having different colors from each other contained in the original, and wherein said setting means sets each color of the original in accordance with the number of pixels of the color counted by the counting means.

18. An apparatus according to claim 16, wherein the recording means records on a recording medium code information corresponding to the color set by said setting means.

19. A color image recording and reproducing apparatus comprising:
  detecting means for detecting an amount of information of each color of an original;
  setting means for setting the color of the original, based on the amount of information of each color detected by said detecting means;
  recording means for recording on a recording medium a code corresponding to the image of the original and the color set by the setting means;
  reading means for reading the image and the code recorded on the recording medium;
  image forming means for selectively forming the image read by the reading means on one of a plurality of different image carriers; and control means for forming an image on a selected image carrier, based on the code read by the reading means.

20. A color image recording and reproducing apparatus comprising:
   detecting means for detecting an amount of information of each color of an original;
   setting means for setting the color of the original, based on the amount of information of each color detected by said detecting means;
   recording means for recording on a recording medium a code corresponding to the image of the original and the color set by the setting means;
   reading means for reading the image and the code recorded on the recording medium; and
   image forming means for forming on an image carrier the image read by the reading means with the color corresponding to the code information read by said reading means.

* * * * *